(12) United States Patent
Shigeta

(10) Patent No.: US 11,075,540 B2
(45) Date of Patent: Jul. 27, 2021

(54) UNINTERRUPTIBLE POWER SUPPLY DEVICE

(71) Applicant: TOSHIBA MITSUBISHI-ELECTRIC INDUSTRIAL SYSTEMS CORPORATION, Chuo-ku (JP)

(72) Inventor: Hiroki Shigeta, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/650,934

(22) PCT Filed: Jul. 23, 2018

(86) PCT No.: PCT/JP2018/027469
§ 371 (c)(1),
(2) Date: Mar. 26, 2020

(87) PCT Pub. No.: WO2020/021591
PCT Pub. Date: Jan. 30, 2020

(65) Prior Publication Data
US 2020/0295595 A1    Sep. 17, 2020

(51) Int. Cl.
*H02J 9/06* (2006.01)
*H02M 5/458* (2006.01)

(52) U.S. Cl.
CPC ........... *H02J 9/062* (2013.01); *H02M 5/4585* (2013.01)

(58) Field of Classification Search
USPC .......................................................... 307/64
See application file for complete search history.

(56) References Cited

U.S. PATENT DOCUMENTS

| 7,372,177 B2 | 5/2008 | Colombi et al. |
| 2017/0163088 A1 | 6/2017 | Toyoda |

FOREIGN PATENT DOCUMENTS

| JP | WO2015198447 | * 12/2015 |
| JP | 2017-112769 A | 6/2017 |

(Continued)

OTHER PUBLICATIONS

International Search Report dated Oct. 23, 2018 in PCT/JP2018/027469 filed Jul. 23, 2018, 1 page.

(Continued)

*Primary Examiner* — Rexford N Barnie
*Assistant Examiner* — Xuan Ly
(74) *Attorney, Agent, or Firm* — Oblon, McClelland, Maier & Neustadt, L.L.P.

(57) ABSTRACT

In a first power feeding mode, a controller supplies AC power output by an inverter to a load. In a second power feeding mode, the controller supplies AC power supplied from an AC power supply to the load. The controller switches an operation mode to the first power feeding mode when a voltage drop of the AC power supply is detected during the second power feeding mode. The controller, for a prescribed time period from detection of the voltage drop, causes a converter to perform reverse conversion to convert DC power output by a power storage device to AC power, and controls the reverse conversion in the converter such that an instantaneous value of an AC voltage output from the converter becomes equal to or higher than an instantaneous value of an AC voltage output from the inverter.

7 Claims, 10 Drawing Sheets

(56) References Cited

FOREIGN PATENT DOCUMENTS

JP         2017112769      *  6/2017
WO    WO 2015/198447 A1    12/2015

OTHER PUBLICATIONS

Notice of Reasons for Refusal dated Jul. 14, 2020 in Japanese Patent Application No. 2019-529660 (with English language translation), 8 pages.
Japanese Office Action dated Feb. 24, 2021 in Japanese Patent Application No. 2019-529660 (with English translation), 6 pages.

* cited by examiner

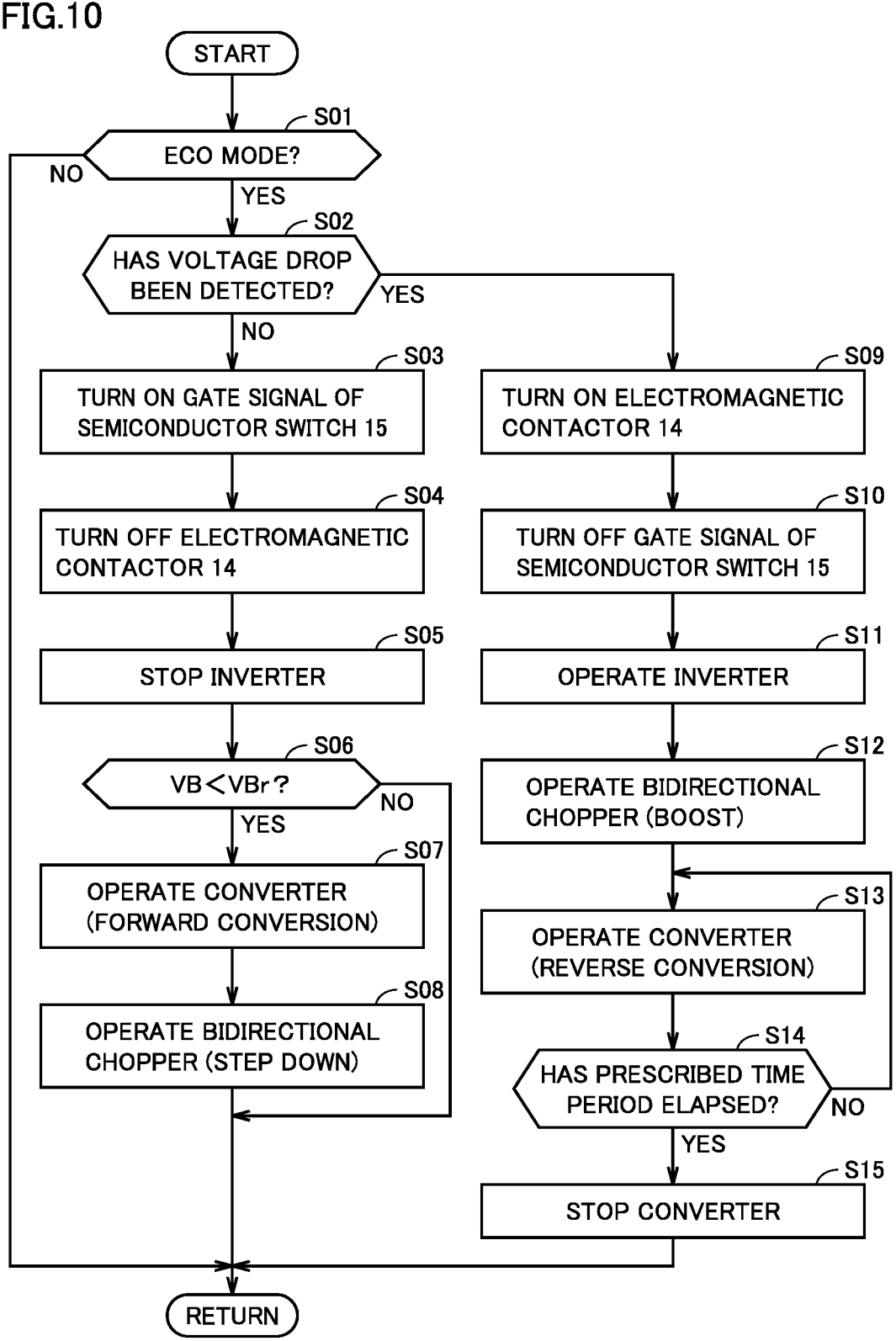

UNINTERRUPTIBLE POWER SUPPLY DEVICE

TECHNICAL FIELD

The present invention relates to an uninterruptible power supply device.

BACKGROUND ART

An uninterruptible power supply device including a converter configured to convert AC power supplied from an AC power supply to DC power, an inverter configured to convert the DC power generated by the converter or DC power of a power storage device to AC power and supply the AC power to a load, and a bypass circuit connected between the AC power supply and the load in parallel with a series circuit of the converter and the inverter is widely used.

In the above-described uninterruptible power supply device, the converter and the inverter are used during normal operation in which the AC power is normally supplied from the AC power supply. During a power failure in which supply of the AC power from the AC power supply is stopped, the inverter is used to continue power feeding. Such a power feeding method is also called "on-line type inverter power feeding method". According to the on-line type inverter power feeding method, electric power is fed from the inverter to the load through a DC link, regardless of whether the AC power supply is normal or the AC power supply fails. Therefore, the quality of output power is easily ensured regardless of the quality of input power, and thus, the on-line type inverter power feeding method is excellent in stability of power feeding to the load. However, according to the on-line type inverter power feeding method, the energy passes through the converter and the inverter during normal operation, which causes a power loss, and thus, the enhancement of operation efficiency remains to be solved.

In recent years, an uninterruptible power supply device having an eco mode has been proposed to achieve greater efficiency (refer to, for example, U.S. Pat. No. 7,372,177 (PTL 1)). According to this, the uninterruptible power supply device executes bypass power feeding for supplying AC power from an AC power supply to a load via a semiconductor switch which is a bypass circuit during normal operation. A thyristor switch formed by connecting a pair of thyristors in antiparallel is used as the semiconductor switch.

CITATION LIST

Patent Literature

PTL 1: U.S. Pat. No. 7,372,177

SUMMARY OF INVENTION

Technical Problem

In the above-described uninterruptible power supply device having the eco mode, uninterrupted switching from bypass power feeding to inverter power feeding is required in order to prevent a voltage drop which is a drop of an AC voltage supplied from the AC power supply during execution of bypass power feeding, or prevent a breakage or a stop of operation of the load device when a power failure occurs. In order to achieve this, it is necessary to shut off the thyristor switch at high speed and start inverter power feeding.

However, the thyristors forming the thyristor switch are turned off when a current flowing through the thyristors reaches zero after a gate signal is cut off. In other words, the thyristor switch is in an on state until the current reaches zero after the gate signal is cut off. Therefore, even if the gate signal of the thyristor switch is cut off when the voltage drop of the AC power supply is detected, the thyristor switch is not turned off immediately, depending on the timing of cutting off the gate signal, and thus, electrical connection between an AC output terminal and an AC input terminal of the uninterruptible power supply device with the thyristor switch being interposed may continue in some cases.

In this case, an AC voltage output from the inverter to the AC output terminal is higher than an AC voltage supplied from the AC power supply to the AC input terminal, and thus, a part of an AC current output from the inverter can flow into the AC input terminal via the thyristor switch. As a result, a current supplied to the load decreases, and thus, occurrence of a power shortage in the load is concerned.

The present invention has been made to solve the above-described problem, and an object of the present invention is to provide an uninterruptible power supply device that can suppress a reduction in load current at the time of switching from an eco mode to an inverter power feeding mode.

Solution to Problem

According to an aspect of the present invention, an uninterruptible power supply device connected between an AC power supply and a load includes: a converter; an inverter; a first switch; a second switch; and a controller. The converter is configured to perform forward conversion of AC power supplied from the AC power supply to DC power. The inverter is configured to perform reverse conversion of the DC power output by the converter or DC power output by a power storage device to AC power. The first switch is connected between the inverter and the load. The second switch is connected between the AC power supply and the load. The controller is configured to control the converter, the inverter, the first switch, and the second switch. The uninterruptible power supply device has a first power feeding mode and a second power feeding mode as an operation mode. In the first power feeding mode, the controller turns on the first switch and turns off the second switch to thereby supply the AC power output by the inverter to the load. In the second power feeding mode, the controller turns off the first switch and turns on the second switch to thereby supply the AC power supplied from the AC power supply to the load. The controller performs switching the operation mode to the first power feeding mode when the controller detects a voltage drop of the AC power supply during execution of the second power feeding mode. The controller, for a prescribed time period from detection of the voltage drop of the AC power supply, causes the converter to perform the reverse conversion to convert the DC power output by the power storage device to the AC power, and controls the reverse conversion in the converter such that an instantaneous value of an AC voltage output from the converter becomes equal to or higher than an instantaneous value of an AC voltage output from the inverter.

Advantageous Effects of Invention

According to the present invention, there can be provided an uninterruptible power supply device that can suppress a reduction in load current at the time of switching from an eco mode to an inverter power feeding mode.

BRIEF DESCRIPTION OF DRAWINGS

FIG. 10 is a flowchart for illustrating a process for control of the uninterruptible power supply device by the controller.

DESCRIPTION OF EMBODIMENTS

Figure 1:
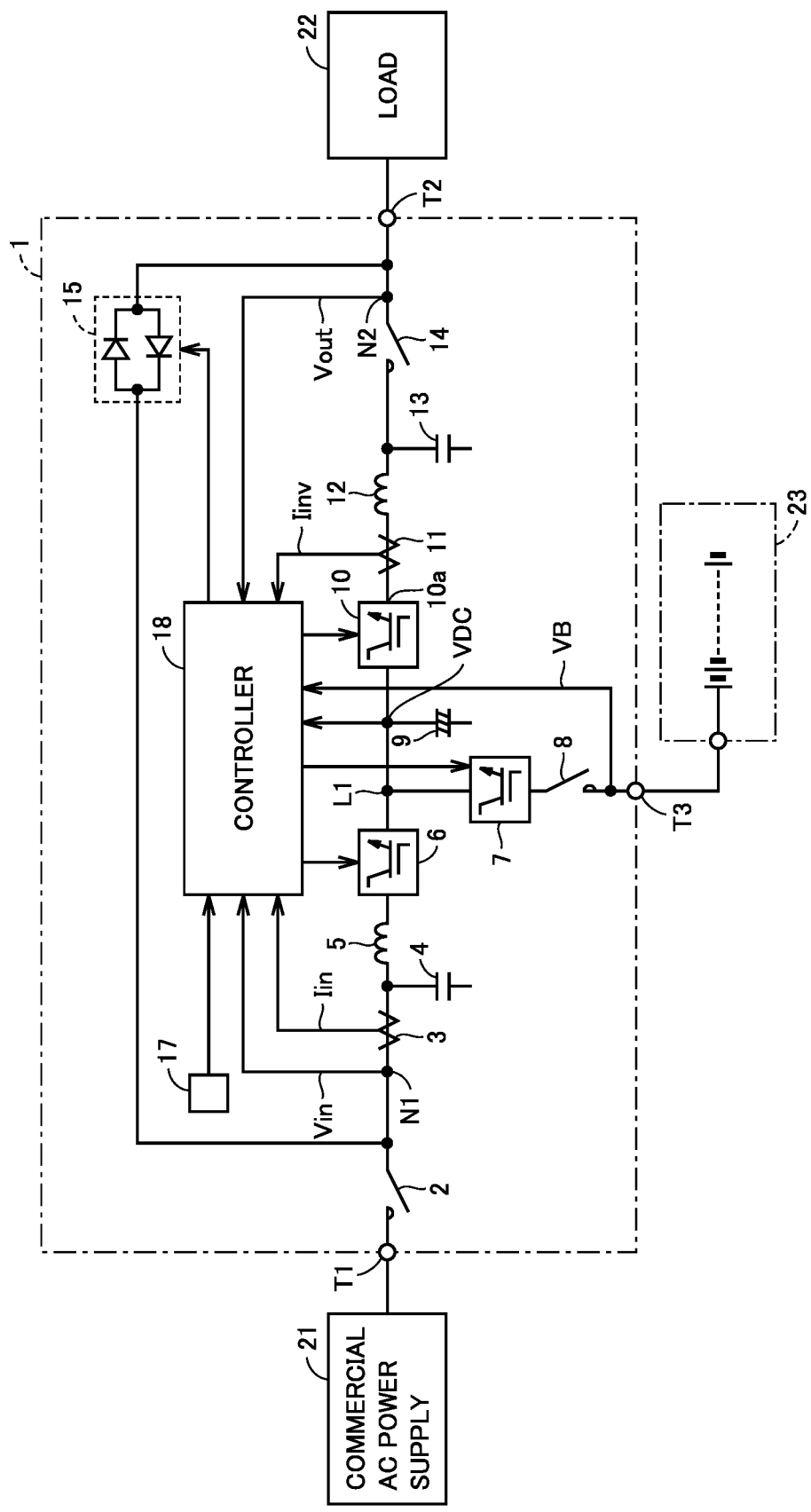
FIG. 1 is a circuit block diagram showing a configuration of an uninterruptible power supply device according to an embodiment of the present invention.

An embodiment of the present invention will be described in detail hereinafter with reference to the drawings, in which the same or corresponding portions are denoted by the same reference characters and description thereof will not be repeated in principle.

FIG. 1 is a circuit block diagram showing a configuration of an uninterruptible power supply device 1 according to an embodiment of the present invention. Uninterruptible power supply device 1 temporarily converts three-phase AC power supplied from a commercial AC power supply 21 to DC power, and convert the DC power to three-phase AC power and supply the three-phase AC power to a load 22. For simplification of the figure and the description, FIG. 1 shows only a circuit of a portion corresponding to one phase (e.g., a U phase) of three phases (the U phase, a V phase and a W phase).

Uninterruptible power supply device 1 has an inverter power feeding mode and a bypass power feeding mode. The inverter power feeding mode is an operation mode in which AC power is supplied from an inverter 10 to load 22. The bypass power feeding mode is an operation mode in which AC power is supplied from commercial AC power supply 21 to load 22 through a semiconductor switch 15.

In the inverter power feeding mode, the AC power supplied from commercial AC power supply 21 is converted to DC power by a converter 6, and the DC power is converted to AC power by inverter 10 and the AC power is supplied to load 22. Therefore, the inverter power feeding mode is excellent in stability of power feeding to load 22.

In contrast, in the bypass power feeding mode, the AC power supplied from commercial AC power supply 21 is supplied to load 22 through semiconductor switch 15 (second switch), i.e., without passing the AC power through converter 6 and inverter 10. Therefore, occurrence of a power loss in converter 6 and inverter 10 is reduced, and thus, the operation efficiency of uninterruptible power supply device 1 can be enhanced. In the following description, the bypass power feeding mode will also be referred to as "eco mode" which is an operation mode in which importance is placed on the highly-efficient operation of uninterruptible power supply device 1. The inverter power feeding mode corresponds to "first power feeding mode" and the bypass power feeding mode (eco mode) corresponds to "second power feeding mode".

In FIG. 1, uninterruptible power supply device 1 includes an AC input terminal T1, an AC output terminal T2 and a battery terminal T3. AC input terminal T1 receives the AC power having a commercial frequency from commercial AC power supply 21.

AC output terminal T2 is connected to load 22. Load 22 is driven by AC power. Battery terminal T3 is connected to a battery (power storage device) 23. Battery 23 stores DC power. Instead of battery 23, a capacitor may be connected.

Uninterruptible power supply device 1 further includes electromagnetic contactors 2, 8 and 14, current detectors 3 and 11, capacitors 4, 9 and 13, reactors 5 and 12, converter 6, a bidirectional chopper 7, inverter 10, semiconductor switch 15, an operation unit 17, and a controller 18.

Electromagnetic contactor 2 and reactor 5 are connected in series between AC input terminal T1 and an input node of converter 6. Capacitor 4 is connected to a node N1 between electromagnetic contactor 2 and reactor 5. Electromagnetic contactor 2 is turned on at the time of use of uninterruptible power supply device 1, and is turned off, for example, at the time of maintenance of uninterruptible power supply device 1.

An instantaneous value of an AC input voltage Vin appearing at node N1 is detected by controller 18. Based on the instantaneous value of AC input voltage Vin, an instantaneous voltage drop, occurrence of a power failure, and the like are determined. Current detector 3 detects an AC input current Iin flowing through node N1, and provides a signal Iin indicating the detection value to controller 18.

Capacitor 4 and reactor 5 form a low pass filter, and allow the AC power having the commercial frequency to flow from commercial AC power supply 21 to converter 6 and prevent a signal of a switching frequency generated in converter 6 from flowing to commercial AC power supply 21.

Converter 6 is controlled by controller 18. Converter 6 performs conversion (forward conversion) of the three-phase AC power to DC power and output the DC power to a DC line L1 during normal operation in which the AC power is supplied from commercial AC power supply 21. At the time of a power failure in which supply of the AC power from commercial AC power supply 21 is stopped, the operation of converter 6 is stopped. An output voltage of converter 6 can be controlled to a desired value.

Capacitor 9 is connected to DC line L1 and smoothes a voltage of DC line L1. An instantaneous value of a DC voltage VDC appearing at DC line L1 is detected by controller 18. DC line L1 is connected to a high voltage-side node of bidirectional chopper 7, and a low voltage-side node of bidirectional chopper 7 is connected to battery terminal T3 with electromagnetic contactor 8 being interposed.

Electromagnetic contactor 8 is turned on at the time of use of uninterruptible power supply device 1, and is turned off, for example, at the time of maintenance of uninterruptible power supply device 1 and battery 23. An instantaneous value of an inter-terminal voltage VB of battery 23 appearing at battery terminal T3 is detected by controller 18.

Bidirectional chopper 7 is controlled by controller 18. Bidirectional chopper 7 stores the DC power generated by converter 6 in battery 23 during normal operation in which the AC power is supplied from commercial AC power supply 21. When an instantaneous voltage drop or a power failure occurs, bidirectional chopper 7 supplies the DC power of battery 23 to inverter 10 through DC line L1.

When the DC power is stored in battery 23, bidirectional chopper 7 steps down DC voltage VDC of DC line L1 and provides stepped-down DC voltage VDC to battery 23. When the DC power of battery 23 is supplied to inverter 10, bidirectional chopper 7 boosts inter-terminal voltage VB of battery 23 and outputs boosted inter-terminal voltage VB to DC line L. DC line L1 is connected to an input node of inverter 10.

Inverter 10 is controlled by controller 18, and performs conversion (reverse conversion) of the DC power supplied from converter 6 or bidirectional chopper 7 through DC line L1 to three-phase AC power having a commercial frequency and outputs the three-phase AC power. That is, inverter 10 converts the DC power supplied from converter 6 through DC line L1 to three-phase AC power during normal operation, and converts the DC power supplied from battery 23 through bidirectional chopper 7 to three-phase AC power at the time of an instantaneous voltage drop or a power failure. An output voltage of inverter 10 can be controlled to a desired value.

An output node 10a of inverter 10 is connected to one terminal of reactor 12 and the other terminal of reactor 12 is connected to AC output terminal T2 with electromagnetic contactor 14 being interposed. Capacitor 13 is connected to a node N2 between electromagnetic contactor 14 and AC output terminal T2.

Current detector 11 detects an instantaneous value of an output current (hereinafter, also referred to as "inverter output current") Iinv of inverter 10 and provides a signal Iinv indicating the detection value to controller 18. An instantaneous value of an AC output voltage Vout appearing at node N2 is detected by controller 18.

Reactor 12 and capacitor 13 form a low pass filter, and allow the AC power of the commercial frequency generated in inverter 10 to flow to AC output terminal T2 and prevent a signal of a switching frequency generated in inverter 10 from flowing to AC output terminal T2.

Electromagnetic contactor 14 is controlled by controller 18. Electromagnetic contactor 14 is turned on in the inverter power feeding mode, and is turned off in the eco mode. Electromagnetic contactor 14 corresponds to one example of "first switch" for supplying the output power of inverter 10 to load 22.

Semiconductor switch 15 is a thyristor switch having a pair of thyristors connected in antiparallel, and is connected between AC input terminal T1 and AC output terminal T2. Semiconductor switch 15 is controlled by controller 18. Semiconductor switch 15 is turned off in the inverter power feeding mode, and is turned on in the eco mode.

Specifically, the pair of thyristors forming the thyristor switch are turned on in response to a gate signal input (turned on) from controller 18. The turned-on thyristors are turned off in response to the current reaching zero in a state where the gate signal is cut off (turned off). During application of the gate signal, the pair of thyristors are alternately turned on every half cycle period of a sinusoidal waveform of the current, in accordance with the polarity of the current.

Semiconductor switch 15 corresponds to one example of "second switch". For example, semiconductor switch 15 is instantaneously turned on when inverter 10 is broken in the inverter power feeding mode, and supplies the three-phase AC power supplied from commercial AC power supply 21 to load 22.

Operation unit 17 includes a plurality of buttons operated by a user of uninterruptible power supply device 1, an image display unit configured to display various types of information, and the like. Operation of operation unit 17 by the user makes it possible to power on and off uninterruptible power supply device 1, and to select one of the eco mode and the inverter power feeding mode.

Controller 18 controls uninterruptible power supply device 1 as a whole, based on a signal from operation unit 17, AC input voltage Vin, AC input current Iin, DC voltage VDC, inter-terminal voltage VB of battery 23, inverter output current Iinv, AC output voltage Vout and the like. The control of uninterruptible power supply device 1 by controller 18 will be described below.

Controller 18 can be formed of, for example, a microcomputer or the like. As one example, controller 18 has a not-shown memory and a not-shown CPU (Central Processing Unit) built therein, and can perform the below-described control operation by software processing by the CPU executing a program prestored in the memory. Alternatively, instead of the software processing, a part or all of the control operation can also be implemented by hardware processing using a built-in dedicated electronic circuit and the like.

Figure 2:
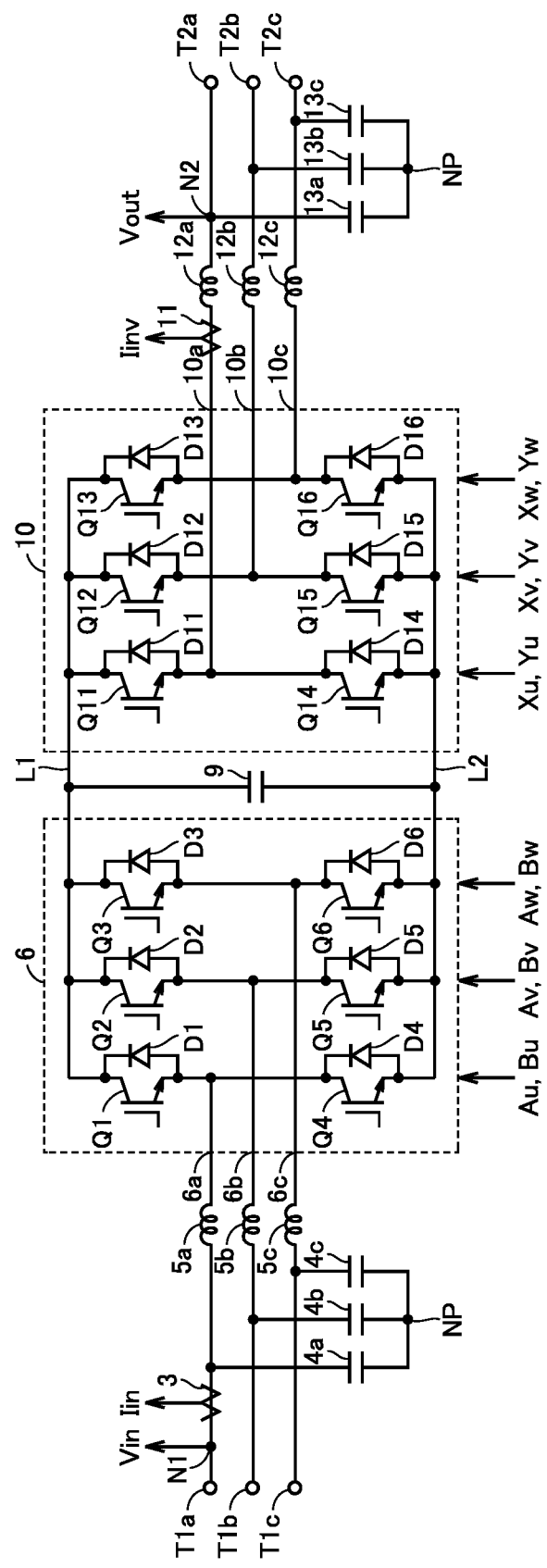
FIG. 2 is a circuit diagram showing a main portion of the uninterruptible power supply device shown in FIG. 1.

FIG. 2 is a circuit diagram showing a main portion of uninterruptible power supply device 1 shown in FIG. 1. Although FIG. 1 shows only the portion related to one phase of the three-phase AC voltage, FIG. 2 shows a portion related to the three phases. In addition, electromagnetic contactors 2 and 14, semiconductor switch 15, operation unit 17, and controller 18 are not shown.

In FIG. 2, uninterruptible power supply device 1 includes AC input terminals T1a, T1b and T1c, AC output terminals T2a, T2b and T2c, current detectors 3 and 11, capacitors 4a, 4b, 4c, 13a, 13b, and 13c, reactors 5a, 5b, 5c, 12a, 12b, and 12c, converter 6, DC lines L1 and L2, and inverter 10.

AC input terminals T1a, T1b and T1c receive three-phase AC voltages (a U-phase AC voltage, a V-phase AC voltage and a W-phase AC voltage) from commercial AC power supply 21 (FIG. 1), respectively. Three-phase AC voltages synchronized with the three-phase AC voltages from commercial AC power supply 21 are output to AC output terminals T2a, T2b and T2c. Load 22 is driven by the three-phase AC voltages from AC output terminals T2a, T2b and T2c.

One terminals of reactors 5a, 5b and 5c are connected to AC input terminals T1a, T1b and T1c, respectively, and the other terminals thereof are connected to input nodes 6a, 6b and 6c of converter 6, respectively. One electrodes of capacitors 4a, 4b and 4c are connected to one terminals of reactors 5a to 5c, respectively, and the other electrodes thereof are all connected to a neutral point NP.

Capacitors 4a to 4c and reactors 5a to 5c form a low pass filter, and allow three-phase AC power having a commercial frequency to flow from AC input terminals T1a, T1b and T1c to converter 6 and cut off a signal of a switching frequency generated in converter 6. An instantaneous value of AC input voltage Vin appearing at one terminal of reactor 5a is detected by controller 18 (FIG. 1). Current detector 3 detects AC input current Iin flowing through node N1 (i.e., AC input terminal T1a), and provides a signal Iin indicating the detection value to controller 18.

Converter 6 includes IGBTs (Insulated Gate Bipolar Transistors) Q1 to Q6 and diodes D1 to D6. The IGBTs form "switching elements". Collectors of IGBTs Q1 to Q3 are all connected to DC line L1, and emitters thereof are connected to input nodes 6a, 6b and 6c, respectively. Collectors of IGBTs Q4 to Q6 are connected to input nodes 6a, 6b and 6c, respectively, and emitters thereof are all connected to DC line L2. Diodes D1 to D6 are connected in antiparallel to IGBTs Q1 to Q6, respectively.

IGBTs Q1 and Q4 are controlled by gate signals Au and Bu, respectively, IGBTs Q2 and Q5 are controlled by gate signals Av and Bv, respectively, and IGBTs Q3 and Q6 are controlled by gate signals Aw and Bw, respectively. Gate signals Bu, Bv and Bw are inverted signals of gate signals Au, Av and Aw, respectively.

IGBTs Q1 to Q3 are turned on when gate signals Au, Av and Aw are set to an "H (logic high)" level, respectively, and are turned off when gate signals Au, Av and Aw are set to an "L (logic low)" level, respectively. IGBTs Q4 to Q6 are turned on when gate signals Bu, Bv and Bw are set to an "H" level, respectively, and are turned off when gate signals Bu, Bv and Bw are set to an "L" level, respectively.

Each of gate signals Au, Bu, Av, Bv, Aw, and Bw is a pulse signal sequence and a PWM (Pulse Width Modulation) signal. A phase of gate signals Au and Bu, a phase of gate signals Av and Bv, and a phase of gate signals Aw and Bw are shifted from each other by 120 degrees. Gate signals Au, Bu, Av, Bv, Aw, and Bw are generated by controller 18.

For example, when a voltage level of AC input terminal T1a is higher than a voltage level of AC input terminal T1b, IGBTs Q1 and Q5 are turned on, and a current flows from AC input terminal T1a through reactor 5a, IGBT Q1, DC line L1, capacitor 9, DC line L2, IGBT Q5, and reactor 5b to AC input terminal T1b, and capacitor 9 is charged to have a positive voltage.

Conversely, when the voltage level of AC input terminal T1b is higher than the voltage level of AC input terminal T1a, IGBTs Q2 and Q4 are turned on, and a current flows from AC input terminal T1b through reactor 5b, IGBT Q2, DC line L1, capacitor 9, DC line L2, IGBT Q4, and reactor 5a to AC input terminal T1a, and capacitor 9 is charged to have a positive voltage. The same applies as well to the other cases.

By turning on and off each of IGBTs Q1 to Q6 at the prescribed timing in accordance with gate signals Au, Bu, Av, Bv, Aw, and Bw and adjusting the on time of each of IGBTs Q1 to Q6, the three-phase AC voltage provided to input nodes 6a to 6c can be converted to DC voltage VDC (inter-terminal voltage of capacitor 9).

Inverter 10 includes IGBTs Q11 to Q16 and diodes D11 to D16. The IGBTs form "switching elements". Collectors of IGBTs Q11 to Q13 are all connected to DC line L1, and emitters thereof are connected to output nodes 10a, 10b and 10 c, respectively. Collectors of IGBTs Q14 to Q16 are connected to output nodes 10a, 10b and 10c, respectively, and emitters thereof are all connected to DC line L2. Diodes D11 to D16 are connected in antiparallel to IGBTs Q11 to Q16, respectively.

IGBTs Q11 and Q14 are controlled by gate signals Xu and Yu, respectively, IGBTs Q12 and Q15 are controlled by gate signals Xv and Yv, respectively, and IGBTs Q13 and Q16 are controlled by gate signals Xw and Yw, respectively. Gate signals Yu, Yv and Yw are inverted signals of gate signals Xu, Xv and Xw, respectively.

IGBTs Q11 to Q13 are turned on when gate signals Xu, Xv and Xw are set to an H level, respectively, and are turned off when gate signals Xu, Xv and Xw are set to an L level, respectively. IGBTs Q14 to Q16 are turned on when gate signals Yu, Yv and Yw are set to an H level, respectively, and are turned off when gate signals Yu, Yv and Yw are set to an L level, respectively.

Each of gate signals Xu, Yu, Xv, Yv, Xw, and Yw is a pulse signal sequence and a PWM signal. A phase of gate signals Xu and Yu, a phase of gate signals Xv and Yv, and a phase of gate signals Xw and Yw are shifted from each other by 120 degrees. Gate signals Xu, Yu, Xv, Yv, Xw, and Yw are generated by controller 18.

For example, when IGBTs Q11 and Q15 are turned on, DC line L1 on the positive side is connected to output node 10a through IGBT Q11 and output node 10b is connected to DC line L2 on the negative side through IGBT Q15, and a positive voltage is output between output nodes 10a and 10b.

When IGBTs Q12 and Q14 are turned on, DC line L1 on the positive side is connected to output node 10b through IGBT Q12 and output node 10a is connected to DC line L2 on the negative side through IGBT Q14, and a negative voltage is output between output nodes 10a and 10b.

By turning on and off each of IGBTs Q11 to Q16 at the prescribed timing in accordance with gate signals Xu, Yu, Xv, Yv, Xw, and Yw and adjusting the on time of each of IGBTs Q11 to Q16, the DC voltage between DC lines L1 and L2 can be converted to a three-phase AC voltage.

One terminals of reactors 12a to 12c are connected to output nodes 10a, 10b and 10c of inverter 10, respectively, and the other terminals thereof are connected to AC output terminals T2a, T2b and T2c, respectively. One electrodes of capacitors 13a, 13b and 13c are connected to the other terminals of reactors 12a to 12c, respectively, and the other electrodes thereof are all connected to neutral point NP.

Reactors 12a to 12c and capacitors 13a, 13b and 13c form a low pass filter, and allow three-phase AC power having a commercial frequency to flow from inverter 10 to AC output terminals T2a, T2b and T2c and cut off a signal of a switching frequency generated in inverter 10.

Current detector 11 detects inverter output current Iinv flowing through reactor 12a, and provides a signal Iinv indicating the detection value to controller 18. An instantaneous value of AC output voltage Vout appearing at the other terminal (node N2) of reactor 12a is detected by controller 18 (FIG. 1).

Next, the operation of uninterruptible power supply device 1 shown in FIG. 1 will be described.

Figure 3:
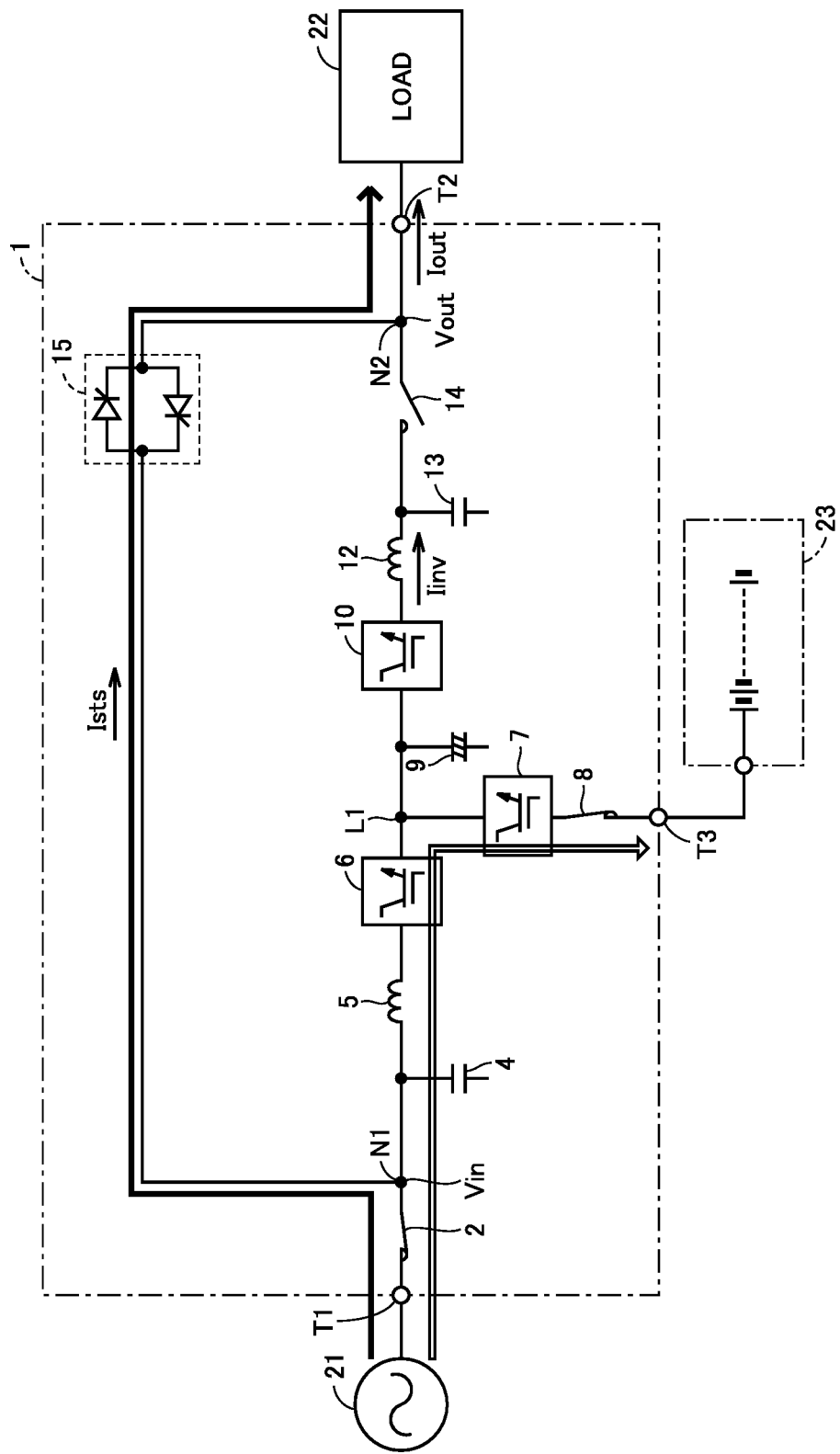
FIG. 3 is a figure for illustrating a flow of electric power in an eco mode.

FIG. 3 is a figure for illustrating a flow of electric power in the eco mode. In the eco mode, semiconductor switch 15 is turned on and electromagnetic contactor 14 is turned off. As a result, as indicated by a black arrow in FIG. 3, the three-phase AC power supplied from commercial AC power supply 21 is supplied to load 22 through semiconductor switch 15. That is, the electric power is supplied to load 22 without passing the electric power through converter 6 and inverter 10. Therefore, occurrence of a power loss in converter 6 and inverter 10 is reduced, and thus, the operation efficiency of uninterruptible power supply device 1 can be enhanced.

By operating converter 6 and bidirectional chopper 7 as needed in the eco mode as well, the DC power can be stored in battery 23 as indicated by a white arrow in FIG. 3.

Returning to FIG. 1, when operation unit 17 is operated by the user, controller 18 switches uninterruptible power supply device 1 from the inverter power feeding mode to the eco mode. Specifically, controller 18 controls on and off of electromagnetic contactor 14 and semiconductor switch 15 such that an electric power path shown in FIG. 3 is formed.

Controller 18 turns on semiconductor switch 15 and turns off electromagnetic contactor 14.

During the eco mode, controller 18 controls converter 6 and bidirectional chopper 7 such that inter-terminal voltage VB of battery 23 reaches a desired target voltage VBr. Converter 6 converts the three-phase AC power supplied from commercial AC power supply 21 to DC power and outputs the DC power to DC line L1. Bidirectional chopper 7 steps down DC voltage VDC of DC line L1 and provides stepped-down DC voltage VDC to battery 23.

During the eco mode, controller 18 further detects the instantaneous value of AC input voltage Vin appearing at node N1, and detects a voltage drop of commercial AC power supply 21 based on the detection value. Specifically, controller 18 calculates the degree of voltage drop (unit: %) of commercial AC power supply 21 based on a difference between an effective value of AC input voltage Vin and a reference voltage. The reference voltage is set at, for example, a rated voltage of commercial AC power supply 21. The degree of voltage drop is defined by the difference between the effective value of AC input voltage Vin and the reference voltage/the reference voltage. When the degree of voltage drop of commercial AC power supply 21 reaches a threshold value, controller 18 switches uninterruptible power supply device 1 from the eco mode to the inverter power feeding mode. The threshold value is set at, for example, 10%.

Figure 4:
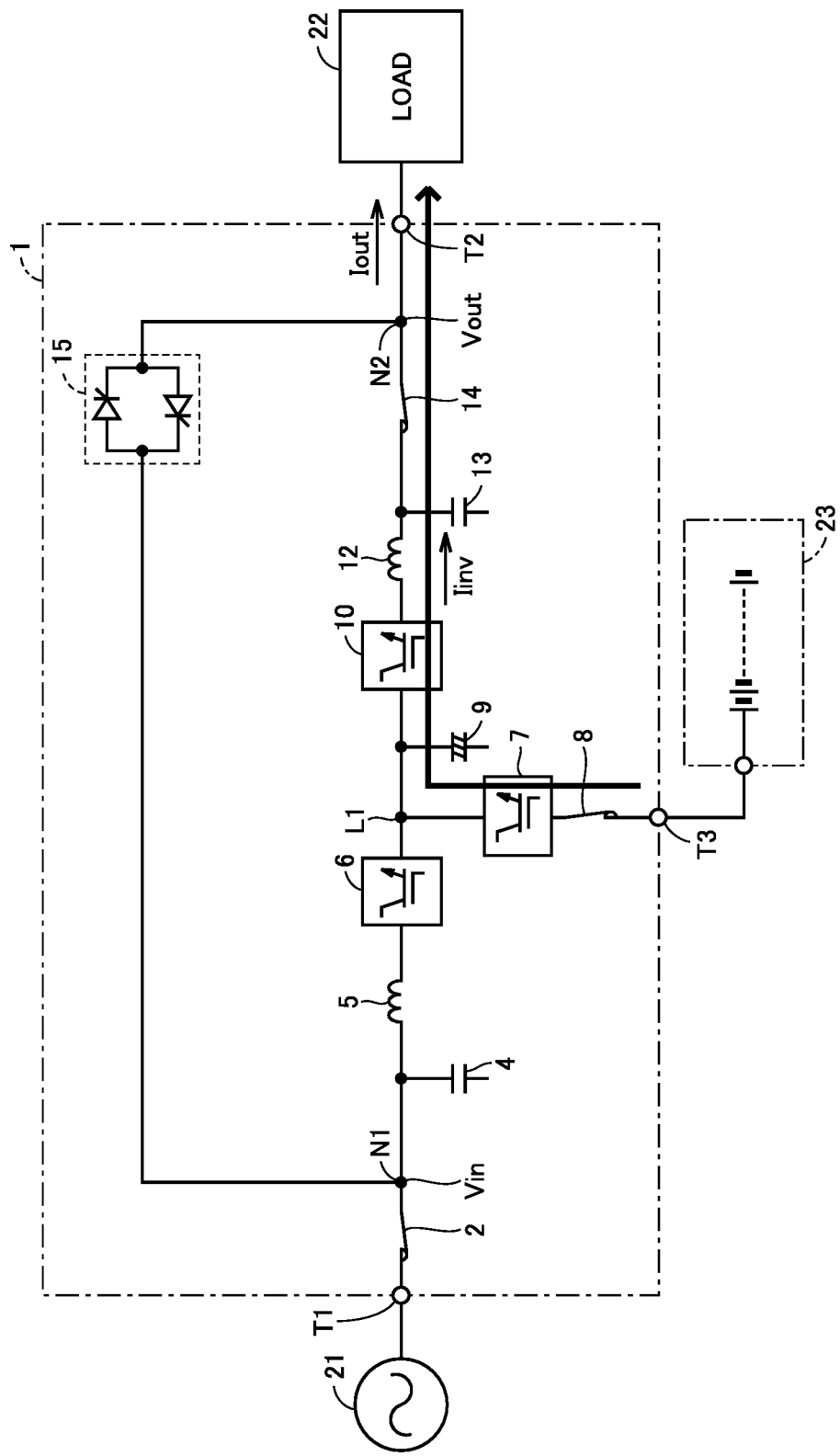
FIG. 4 is a figure for illustrating a flow of electric power in an inverter power feeding mode.

FIG. 4 is a figure for illustrating a flow of electric power in the inverter power feeding mode. When the voltage drop of commercial AC power supply 21 is detected during the eco mode, controller 18 turns on electromagnetic contactor 14 and turns off semiconductor switch 15.

Controller 18 starts up inverter 10 and controls inverter 10 to convert DC power supplied from DC line L1 to three-phase AC power having a commercial frequency. Controller 18 further controls bidirectional chopper 7 to boost inter-terminal voltage VB of battery 23 and output boosted inter-terminal voltage VB to DC line L1. As a result, as indicated by a black arrow in FIG. 4, the DC power of battery 23 is converted to three-phase AC power having a commercial frequency and the three-phase AC power is supplied to load 22 through electromagnetic contactor 14. Converter 6 is not operated. When a remaining capacity of battery 23 reaches a predetermined lower limit value, controller 18 stops the operation of inverter 10. As a result, uninterruptible power supply device 1 ends the inverter power feeding.

When the voltage drop of commercial AC power supply 21 is detected during the eco mode as described above, electromagnetic contactor 14 is turned on and semiconductor switch 15 is turned off, and inverter 10 performs the reverse conversion. As a result, uninterrupted switching from the eco mode to the inverter power feeding mode becomes possible.

However, in semiconductor switch 15, the thyristors forming the thyristor switch are turned off when a current flowing through the thyristors reaches zero after the gate signal is cut off. In other words, the thyristor switch is in an on state until the current reaches zero after the gate signal is cut off. Therefore, even if the gate signal of semiconductor switch 15 is cut off when the voltage drop of commercial AC power supply 21 is detected, semiconductor switch 15 is not turned off immediately, depending on the timing of cutting off the gate signal, and thus, electrical connection between node N1 and node N2 with semiconductor switch 15 being interposed may continue in some cases. When such a case occurs, the current can flow from node N2 toward node N1 until semiconductor switch 15 is turned off, as shown in FIG. 5.

Figure 5:
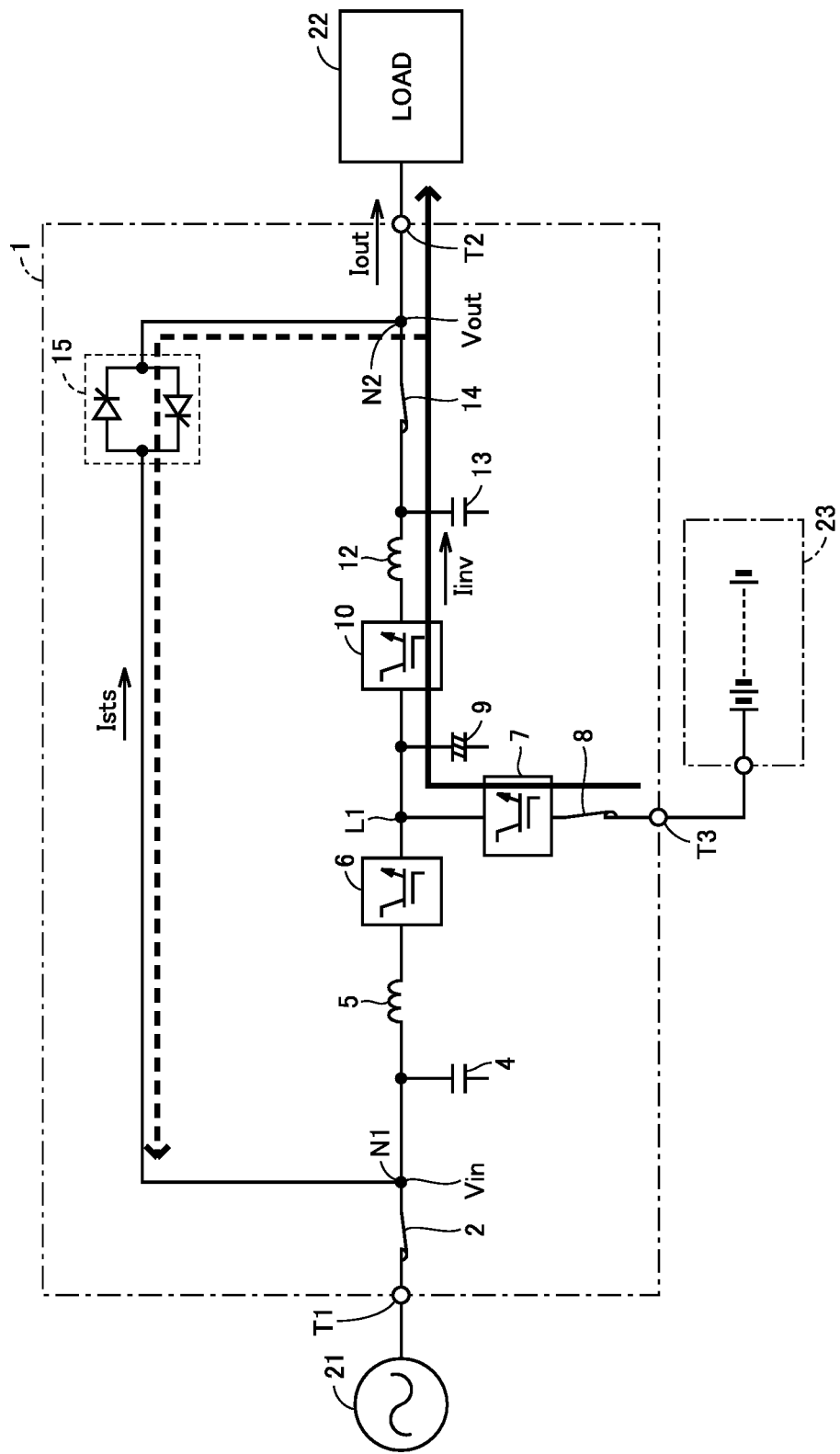
FIG. 5 is a figure for illustrating a flow of electric power at the time of switching from the eco mode to the inverter power feeding mode.

FIG. 5 is a figure for illustrating a flow of electric power at the time of switching from the eco mode to the inverter power feeding mode. FIG. 5 shows the flow of electric power when switching from the eco mode to the inverter power feeding mode is performed after the voltage drop of commercial AC power supply 21 is detected.

As described with reference to FIG. 4, by turning on electromagnetic contactor 14 and starting up inverter 10 and bidirectional chopper 7, the DC power of battery 23 is converted to three-phase AC power having a commercial frequency and the three-phase AC power is supplied to load 22 through electromagnetic contactor 14 as indicated by a black arrow.

Inverter 10 can control AC output voltage Vout output to node N2 such that AC output voltage Vout is synchronized with an AC voltage supplied from commercial AC power supply 21 when commercial AC power supply 21 is normal. As a result, an instantaneous drop of the voltage (AC output voltage Vout) output to AC output terminal T2 at the time of switching from the eco mode to the inverter power feeding mode can be reduced.

However, semiconductor switch 15 is still in the on state because the current does not reach zero although the gate signal is cut off. In FIG. 5, the current flowing through semiconductor switch 15 is denoted as "Ists". A direction from node N1 toward node N2 is a positive direction of current Ists and a direction from node N2 toward node N1 is a negative direction of current Ists.

Due to the occurrence of the voltage drop of commercial AC power supply 21, AC input voltage Vin appearing at node N1 is lower than AC input voltage Vin when commercial AC power supply 21 is normal. Therefore, a relationship of Vout>Vin is between AC output voltage Vout appearing at node N2 and AC input voltage Vin appearing at node N1.

The relationship of Vout>Vin occurs when semiconductor switch 15 is in the on state, and thus, a part of inverter output current Iinv may flow from node N2 toward node N1 as indicated by a broken arrow in FIG. 5. Since the part of inverter output current Iinv is guided to AC input terminal T1 through semiconductor switch 15 and node N1, a current (hereinafter, also referred to as "load current") Iout supplied to load 22 decreases. As a result, a power shortage may occur in load 22.

Figure 6:
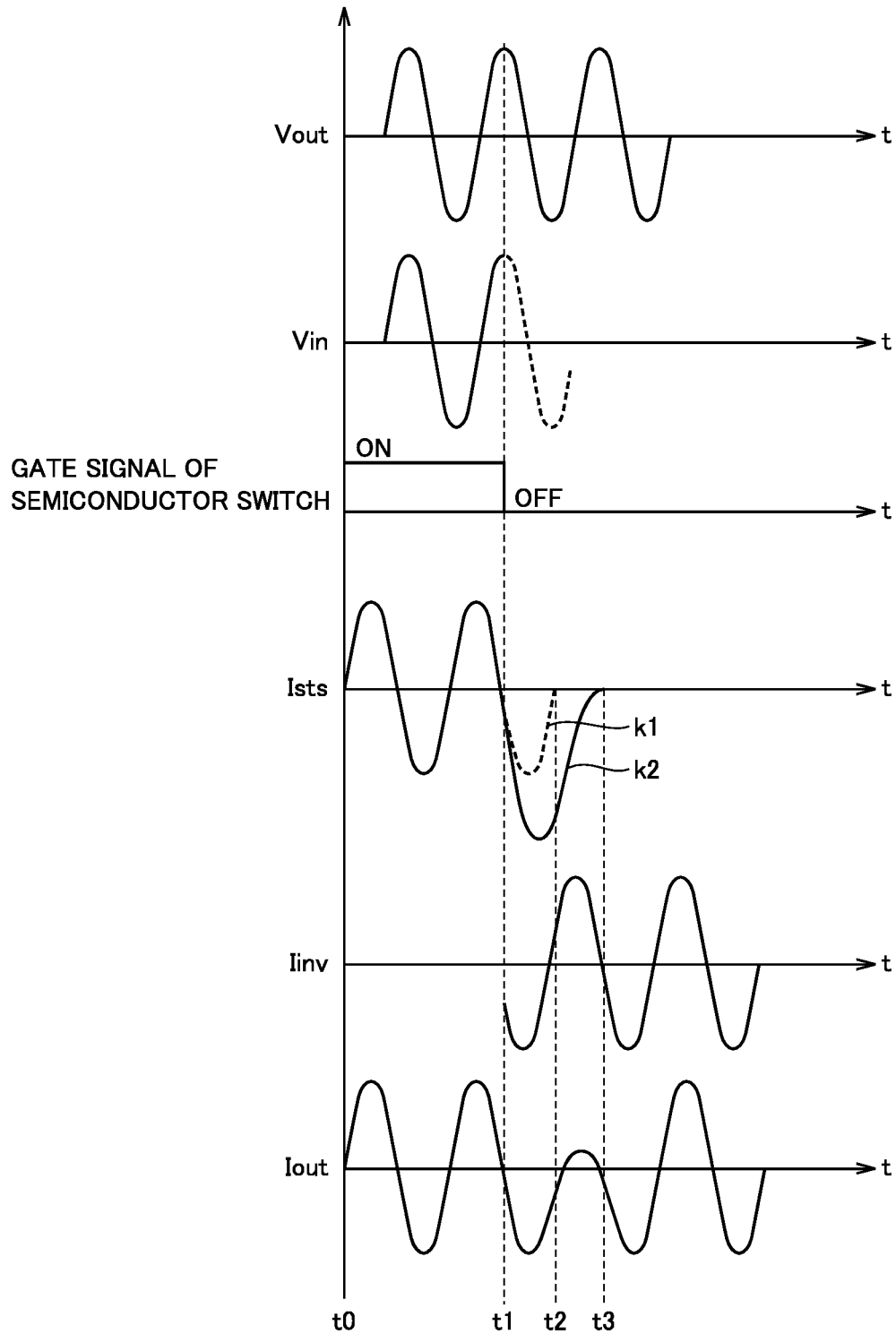
FIG. 6 is a waveform diagram for illustrating the operation of the uninterruptible power supply device at the time of switching from the eco mode to the inverter power feeding mode.

FIG. 6 is a waveform diagram for illustrating the operation of uninterruptible power supply device 1 at the time of switching from the eco mode to the inverter power feeding mode. FIG. 6 shows waveforms of AC output voltage Vout, AC input voltage Vin, the gate signal applied to semiconductor switch 15, current Ists flowing through semiconductor switch 15, inverter output current Iinv, and load current Iout.

Referring to FIG. 6, during a time period from time t0 to time t1, commercial AC power supply 21 is normal and the eco mode is in execution. During the time period, the gate signal is applied to the pair of thyristors forming semiconductor switch 15. In the state in which the gate signal is applied, the pair of thyristors are alternately turned on every half cycle period of a sinusoidal waveform of current Ists in accordance with the polarity of current Ists. As a result, AC output voltage Vout synchronized with AC input voltage Vin appears at node N2. Current Ists is supplied to load 22 as load current Iout.

It is assumed that the voltage drop (e.g., a power failure) of commercial AC power supply 21 occurs at time t1. When controller 18 detects the voltage drop of commercial AC power supply 21, controller 18 turns on electromagnetic contactor 14 and cuts off the gate signal of semiconductor switch 15. Furthermore, controller 18 starts up inverter 10. Inverter 10 converts the DC power stored in battery 23 to three-phase AC power having a commercial frequency. Inverter 10 outputs an AC voltage synchronized with the AC voltage supplied from commercial AC power supply 21 before the voltage drop occurs. Therefore, AC output voltage Vout can be maintained after time t1. However, after time t1, the relationship of Vout>Vin is between AC input voltage Vin and AC output voltage Vout.

In semiconductor switch 15, at time t1 when the gate signal is cut off, one of the pair of thyristors is in the on state in accordance with the polarity of current Ists. In the example of FIG. 6, one of the thyristors is in the on state for a negative half cycle period of current Ists. When current Ists reaches zero after time t1, the one of the thyristors is turned off, and thus, semiconductor switch 15 is turned off. A waveform k1 in FIG. 6 indicates a manner of change in current Ists at the same frequency and amplitude as those of current Ists before time t1. In this case, at time t2 when the substantially negative half cycle period has elapsed from time t1, current Ists reaches zero and semiconductor switch 15 is turned off.

Actually, however, the relationship of Vout>Vin exists after time t1, and thus, the part of inverter output current Iinv flows from node N2 toward node N1 through semiconductor switch 15 as indicated by the broken arrow in FIG. 5. As a result, as in a waveform k2 in FIG. 6, current Ists in the negative direction increases. When current Ists reaches zero at time t3 later than time t2, semiconductor switch 15 is turned off.

As described above, depending on the phase of current Ists at the time of cut-off of the gate signal of semiconductor switch 15 (time t1), a time difference is produced between this time and the time when current Ists reaches zero. During the time period corresponding to the time difference, inverter output current Iinv flows into semiconductor switch 15 due to the relationship of Vout>Vin, and thus, load current Iout decreases temporarily. The temporary decrease in load current Iout may cause a power shortage in load 22.

Accordingly, in uninterruptible power supply device 1 according to the present embodiment, when the voltage drop of commercial AC power supply 21 is detected during the eco mode, the instantaneous value of AC input voltage Vin is temporarily increased to be equal to or higher than the instantaneous value of AC output voltage Vout by using converter 6. That is, a relationship of Vin≥Vout is temporarily formed between AC input voltage Vin and AC output voltage Vout. "Temporarily" means that the above-described relationship is formed during the time period from when the voltage drop of commercial AC power supply 21 is detected to when semiconductor switch 15 is turned off. This is because inverter output current Iinv no longer flows into semiconductor switch 15 after semiconductor switch 15 is turned off.

Figure 7:
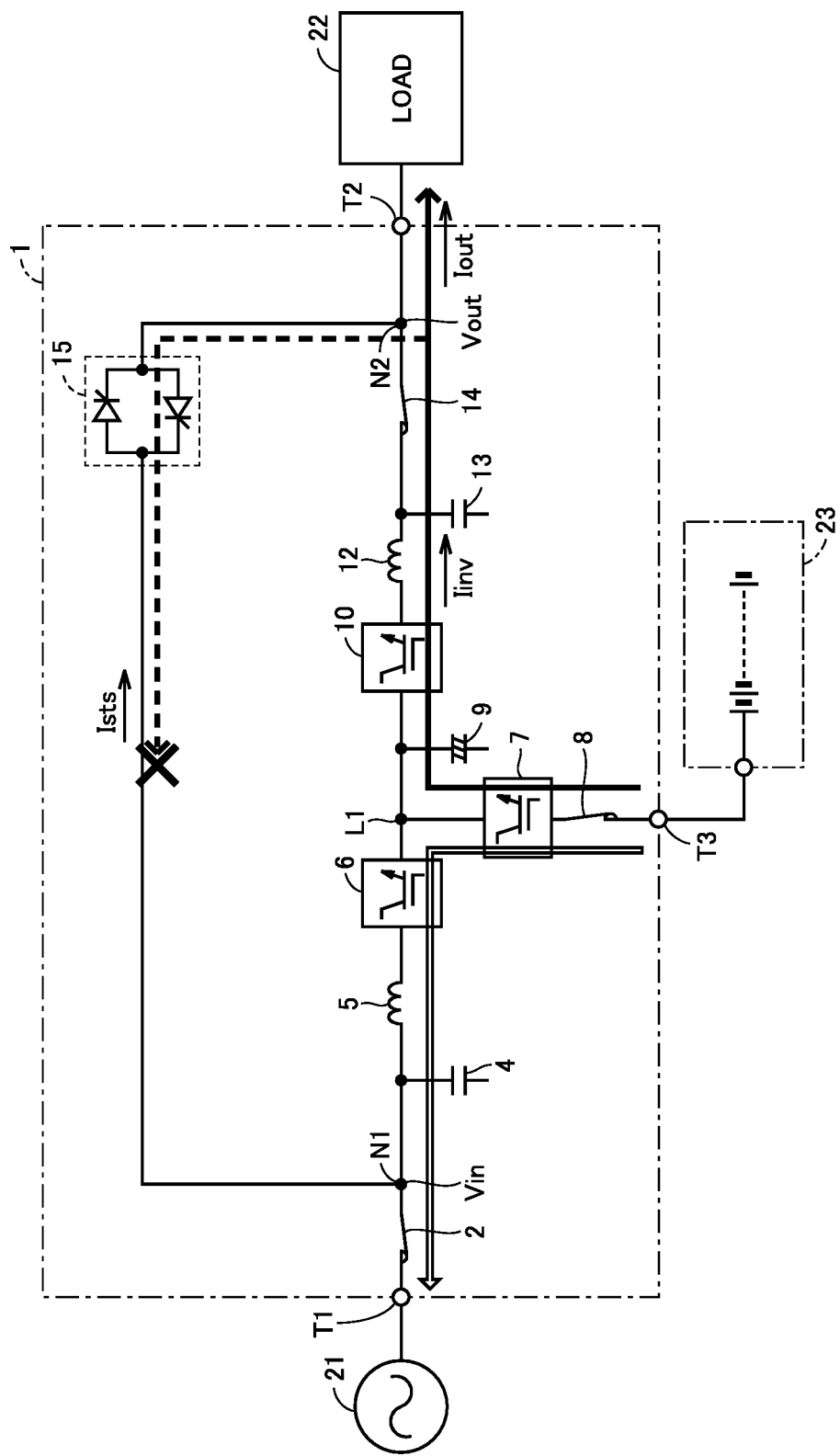
FIG. 7 is a figure for illustrating a flow of electric power at the time of switching from the eco mode to the inverter power feeding mode.

FIG. 7 is a figure for illustrating the operation of uninterruptible power supply device 1 at the time of switching from the eco mode to the inverter power feeding mode. FIG. 7 shows a flow of electric power at the time of switching from the eco mode to the inverter power feeding mode, and is compared with FIG. 5.

When the voltage drop of commercial AC power supply 21 is detected during the eco mode, controller 18 turns on electromagnetic contactor 14 and starts up inverter 10 and bidirectional chopper 7. As a result, as indicated by a black arrow, the DC power of battery 23 is converted to three-phase AC power having a commercial frequency and the three-phase AC power is supplied to load 22 through electromagnetic contactor 14. However, semiconductor switch 15 is still in the on state because current Ists does not reach zero although the gate signal is cut off.

In such a state, controller 18 controls converter 6 to perform conversion (reverse conversion) of the DC power supplied from bidirectional chopper 7 through DC line L1 to three-phase AC power. The AC output voltage of converter 6 can be controlled to a desired value. As indicated by a white arrow in FIG. 7, the DC power of battery 23 is converted to three-phase AC power by converter 6 and the three-phase AC power is supplied to node N1.

At this time, controller 18 controls the reverse conversion such that the instantaneous value of AC input voltage Vin appearing at node N1 is equal to or higher than the instantaneous value of AC output voltage Vout. By using the AC voltage output from converter 6 to back up a reduction in AC input voltage Vin caused by the instantaneous voltage drop or the power failure of commercial AC power supply 21, the reduction in AC input voltage Vin can be delayed. Furthermore, the relationship of Vin≥Vout is formed, and thus, the flow of current Ists from node N2 toward node N1 can be reduced even when semiconductor switch 15 is in the on state. As a result, as indicated by the black arrow in FIG. 7, inverter output current Iinv can be supplied as it is to load 22 as load current Iout, and thus, a power shortage in load 22 can be avoided.

Figure 8:
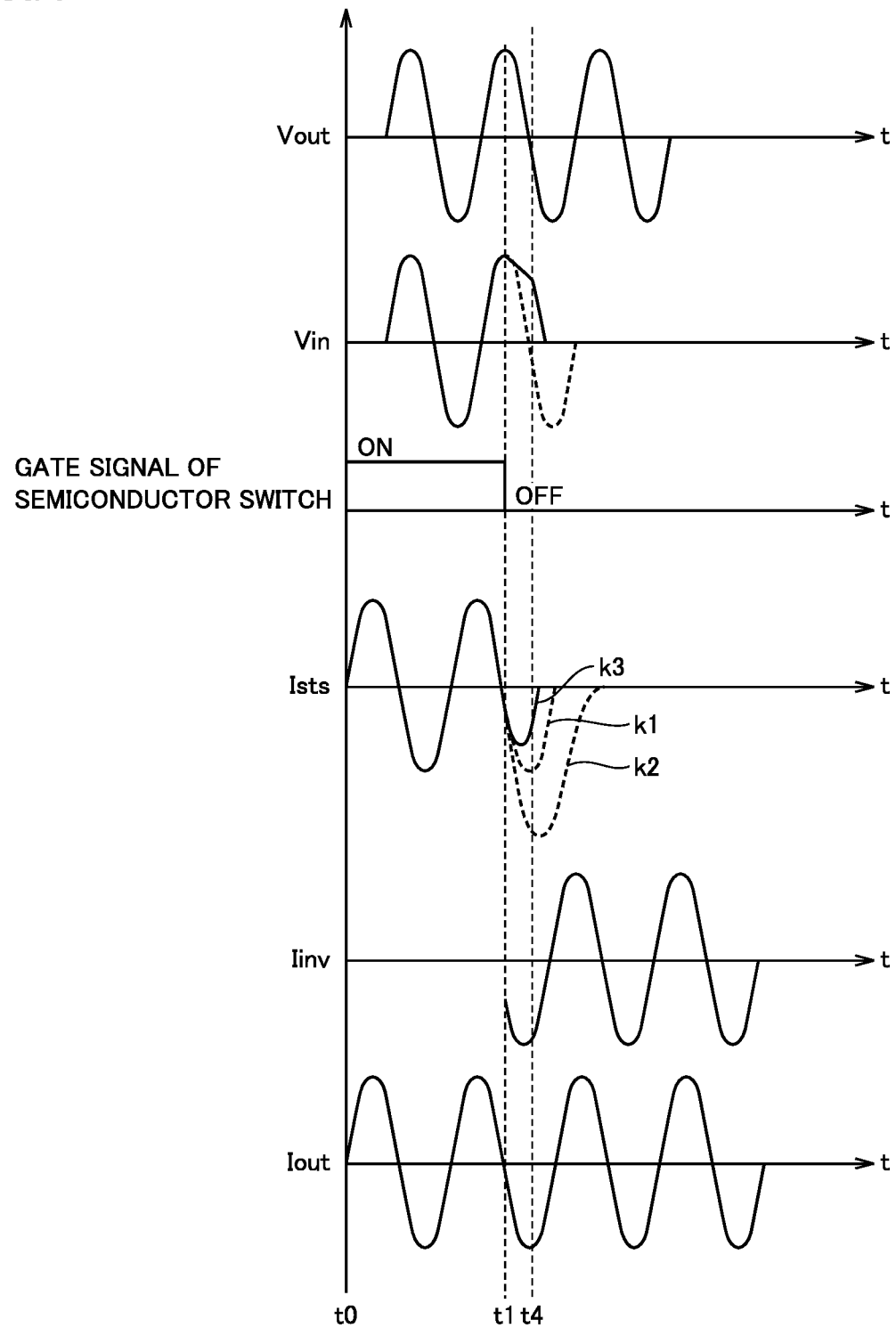
FIG. 8 is a waveform diagram for illustrating the operation of the uninterruptible power supply device at the time of switching from the eco mode to the inverter power feeding mode.

FIG. 8 is a waveform diagram for illustrating the operation of uninterruptible power supply device 1 at the time of switching from the eco mode to the inverter power feeding mode, and is compared with FIG. 6. FIG. 8 shows waveforms of AC output voltage Vout, AC input voltage Vin, the gate signal applied to semiconductor switch 15, current Ists flowing through semiconductor switch 15, inverter output current Iinv, and load current Iout.

Referring to FIG. 8, during a time period from time t0 to time t1, commercial AC power supply 21 is normal and the eco mode is in execution. The gate signal is applied to semiconductor switch 15. When semiconductor switch 15 is turned on, commercial AC power supply 21 and load 22 are electrically connected to each other with semiconductor switch 15 being interposed. As a result, AC output voltage Vout synchronized with AC input voltage Vin appears at node N2. Current Ists flowing through semiconductor switch 15 is supplied to load 22 as load current Iout.

When the voltage drop of commercial AC power supply 21 occurs at time t1, controller 18 turns on electromagnetic contactor 14 and cuts off the gate signal of semiconductor switch 15. Furthermore, controller 18 starts up inverter 10. Inverter 10 converts the DC power stored in battery 23 to three-phase AC power having a commercial frequency. AC output voltage Vout synchronized with the AC voltage (AC input voltage Vin) supplied from commercial AC power supply 21 before the voltage drop occurs is output to node N2. Therefore, AC output voltage Vout can be maintained after time t1.

In semiconductor switch 15, at time t1 when the gate signal is cut off, one of the pair of thyristors are in the on state in accordance with the polarity of current Ists. When current Ists reaches zero after time t1, the one of the thyristors is turned off and semiconductor switch 15 as a whole is turned off. Waveforms k1 and k2 in FIG. 8 are the same as waveforms k1 and k2 shown in FIG. 6, respectively. As described with reference to FIG. 6, when the relationship of Vout>Vin occurs after time t1, the part of inverter output current Iinv flows into semiconductor switch 15, and thus, negative current Ists increases.

In the example of FIG. 8, after time t1, controller 18 controls the reverse conversion in converter 6 such that the relationship of Vin>Vout is formed between the instantaneous value of AC input voltage Vin and the instantaneous value of AC output voltage Vout. As a result, node N1 becomes higher in voltage level than node N2, and thus, the flow of inverter output current Iinv into semiconductor switch 15 is reduced, and as a result, inverter output current Iinv is output from AC output terminal T2 as load current Iout.

Vin>Vout causes an increase in current in a direction (positive direction) opposite to current Ists in the negative direction, and thus, current Ists can be reduced. As a result, as indicated by a waveform k3 in FIG. 8, current Ists can reach zero more quickly than waveform k1. Therefore, a time difference between when the gate signal of semiconductor switch 15 is cut off (time t1) and when current Ists reaches zero can be reduced. As a result, semiconductor switch 15 can be turned off immediately after the voltage drop of commercial AC power supply 21 occurs.

As shown in FIG. 8, the reverse conversion in converter 6 may only be performed temporarily during a time period from when the gate signal of semiconductor switch 15 is cut off to when semiconductor switch 15 is turned off. In the present embodiment, a time period of the reverse conversion in converter 6 is preset, and when the voltage drop of commercial AC power supply 21 is detected, controller 18 operates converter 6 only for the prescribed time period. The prescribed time period can, for example, be set to have a length of not longer than a ½ cycle of the AC voltage supplied from commercial AC power supply 21. A reason why a maximum value of the prescribed time period is set at the ½ cycle of the AC voltage is that a half cycle period at most is required from when the gate signal is cut off to when current Ists of the thyristors of semiconductor switch 15 reaches zero. Preferably, the prescribed time period is set to have a length of not shorter than a ¼ cycle and not longer than the ½ cycle of the AC voltage supplied from commercial AC power supply 21.

When the reverse conversion in converter 6 is controlled such that a relationship of Vin=Vout is formed, AC input voltage Vin and AC output voltage Vout can be ideally synchronized with each other after time t1 as well. Therefore, in the example of FIG. 8, as in waveform k1, at the time when the substantially negative half cycle period has elapsed from time t1, current Ists reaches zero and semiconductor switch 15 is turned off.

Next, a control configuration of uninterruptible power supply device 1 by controller 18 will be described with reference to FIGS. 9 and 10.

Figure 9:
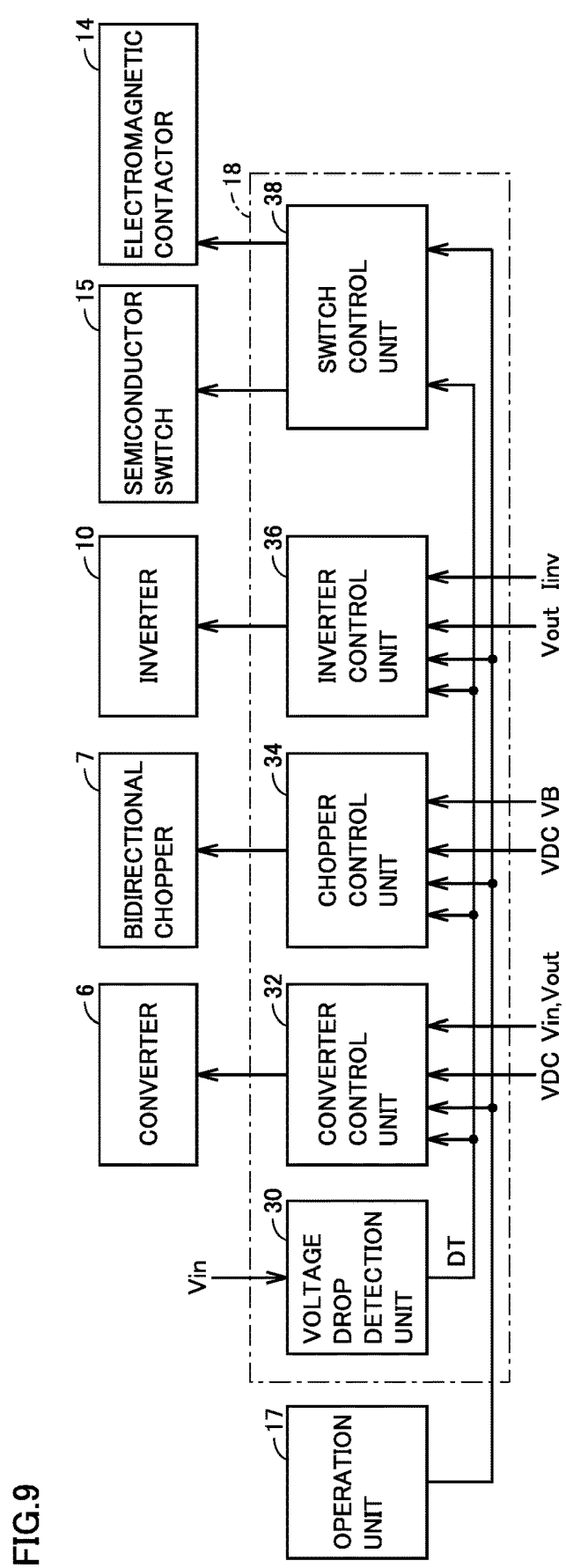
FIG. 9 is a block diagram for illustrating a control configuration of the uninterruptible power supply device by a controller.

FIG. 9 is a block diagram for illustrating a control configuration of uninterruptible power supply device 1 by controller 18. The function of each block shown in FIG. 9 can be implemented by at least one of software processing and hardware processing by controller 18.

Referring to FIG. 9, controller 18 includes a voltage drop detection unit 30, a converter control unit 32, a chopper control unit 34, an inverter control unit 36, and a switch control unit 38.

Voltage drop detection unit 30 detects the instantaneous value of AC input voltage Vin appearing at node N1, and detects the voltage drop of commercial AC power supply 21 based on the detection value. Voltage drop detection unit 30 calculates the degree of voltage drop of commercial AC power supply 21 based on the difference between the effective value of AC input voltage Vin and the reference voltage (rated voltage). During the eco mode, voltage drop detection unit 30 compares the degree of voltage drop and the threshold value (e.g., 10%). When the degree of voltage drop of commercial AC power supply 21 reaches the threshold value, voltage drop detection unit 30 provides a detection signal DT to converter control unit 32, chopper control unit 34, inverter control unit 36, and switch control unit 38.

Converter control unit 32 controls converter 6 based on a signal from operation unit 17, AC input voltage Vin, AC output voltage Vout, and DC voltage VDC. Specifically, during the inverter power feeding mode, converter control unit 32 controls the forward conversion in converter 6 such that DC voltage VDC reaches a prescribed reference voltage VDCr. However, when detection signal DT is received from voltage drop detection unit 30 during the inverter power feeding mode (e.g., at the time of a power failure of commercial AC power supply 21), converter control unit 32 stops the operation of converter 6.

In contrast, during the eco mode, converter control unit 32 stops the operation of converter 6. However, converter 6 is operated as needed, and thus, the DC power can be stored in battery 23. Furthermore, when detection signal DT is received from voltage drop detection unit 30 during the eco mode, converter control unit 32 controls the reverse conversion in converter 6 such that AC input voltage Vin equal to or higher than AC output voltage Vout is output from converter 6 to node N1. Converter control unit 32 controls the reverse conversion in converter 6 only for a prescribed time period from reception of detection signal DT, and then, stops the operation of converter 6.

Chopper control unit 34 controls bidirectional chopper 7 based on a signal from operation unit 17, DC voltage VDC and inter-terminal voltage VB of battery 23. Specifically, during the inverter power feeding mode, chopper control unit 34 controls the step-down operation in bidirectional chopper 7 such that inter-terminal voltage VB of battery 23 reaches target voltage VBr. When detection signal DT is received from voltage drop detection unit 30 during the inverter power feeding mode, chopper control unit 34 controls the boost operation in bidirectional chopper 7 such that DC voltage VDC reaches reference voltage VDCr.

In contrast, during the eco mode, chopper control unit 34 stops the operation of bidirectional chopper 7. However, bidirectional chopper 7 is operated along with the operation of converter 6, and thus, the DC power can be stored in battery 23. When detection signal DT is received from voltage drop detection unit 30 during the eco mode, chopper control unit 34 controls the boost operation in bidirectional chopper 7 such that DC voltage VDC reaches reference voltage VDCr.

Inverter control unit 36 controls inverter 10 based on a signal from operation unit 17, AC output voltage Vout and inverter output current Iinv. Specifically, during the inverter power feeding mode, inverter control unit 36 controls inverter 10 such that an AC voltage synchronized with the AC voltage supplied from commercial AC power supply 21 is output from inverter 10.

In contrast, during the eco mode, inverter control unit 36 generates the gate signal for turning on and off each semiconductor switching element forming inverter 10. Inverter control unit 36 generates the gate signal such that the AC voltage synchronized with the AC voltage supplied from commercial AC power supply 21 is output from inverter 10. However, inverter control unit 36 does not output the generated gate signal to inverter 10 during the eco mode.

Therefore, inverter 10 is not operated during the eco mode and is in a standby state until the gate signal is input from inverter control unit 36.

When detection signal DT is received from voltage drop detection unit 30 during the eco mode, inverter control unit 36 starts up inverter 10 that is in the standby state, and outputs the generated gate signal to inverter 10. As a result, inverter 10 starts up and switching from the eco mode to the inverter power feeding mode is performed.

Switch control unit 38 controls on and off of electromagnetic contactor 14 and semiconductor switch 15 based on a signal from operation unit 17. When the inverter power feeding mode is executed, switch control unit 38 turns on electromagnetic contactor 14 and turns off semiconductor switch 15. Specifically, switch control unit 38 cuts off the gate signal applied to the pair of thyristors forming semiconductor switch 15. When the current flowing through the thyristors reaches zero after the gate signal is cut off, semiconductor switch 15 is turned off. In contrast, when the eco mode is executed, switch control unit 38 applies the gate signal to each thyristor to thereby turn on semiconductor switch 15 and turn off electromagnetic contactor 14. As a result, the electric power path shown in FIG. 2 is formed between commercial AC power supply 21 and load 22.

When detection signal DT is received from voltage drop detection unit 30 during the eco mode, switch control unit 38 turns on electromagnetic contactor 14 and turns off semiconductor switch 15. As described above, converter control unit 32 controls the reverse conversion in converter 6 during the prescribed time period from when switch control unit 38 cuts off the gate signal applied to each thyristor of semiconductor switch 15. As a result, AC input voltage Vin increases to a voltage level equal to or higher than AC output voltage Vout, and thus, the flow of inverter output current Iinv into node N1 through semiconductor switch 15 can be reduced.

FIG. 10 is a flowchart for illustrating a process for control of uninterruptible power supply device 1 by controller 18. Controller 18 performs the control process shown in FIG. 10 and the function of controller 18 shown in FIG. 9 is thereby implemented in uninterruptible power supply device 1.

Referring to FIG. 10, in step S01, controller 18 determines whether or not uninterruptible power supply device 1 is in the eco mode. When the user operates operation unit 17 to thereby select the eco mode, controller 18 determines that uninterruptible power supply device 1 is in the eco mode. When uninterruptible power supply device 1 is not in the eco mode, subsequent steps S02 to S015 are skipped.

When uninterruptible power supply device 1 is in the eco mode (YES in S01), controller 18 determines in step S02 whether or not the voltage drop of commercial AC power supply 21 has been detected. When the degree of voltage drop of commercial AC power supply 21 does not reach the threshold value, controller 18 determines that the voltage drop of commercial AC power supply 21 has been detected.

When the voltage drop of commercial AC power supply 21 has not been detected (NO in S02), controller 18 continues the execution of the eco mode. Specifically, controller 18 applies the gate signal to semiconductor switch 15 in step S03, and turns off electromagnetic contactor 14 in step S04. Furthermore, controller 18 stops the operation of inverter 10 in step S05. However, controller 18 generates the gate signal such that the AC voltage synchronized with the AC voltage supplied from commercial AC power supply 21 is output from inverter 10. Controller 18 does not output the generated gate signal to inverter 10 and brings inverter 10 into the standby state until the gate signal is input.

Next, in step S06, controller 18 compares inter-terminal voltage VB of battery 23 with target voltage VBr. When inter-terminal voltage VB of battery 23 is lower than target voltage VBr (YES in S06), controller 18 proceeds to step S07 and controls the forward conversion in converter 6 such that inter-terminal voltage VB of battery 23 reaches target voltage VBr. Furthermore, in step S08, controller 18 controls the step-down operation in bidirectional chopper 7 such that inter-terminal voltage VB of battery 23 reaches target voltage VBr.

Returning to step S02, when the voltage drop of commercial AC power supply 21 has been detected (YES in S02), controller 18 performs switching from the eco mode to the inverter power feeding mode. Specifically, controller 18 turns on electromagnetic contactor 14 in step S09, and cuts off the gate signal of semiconductor switch 15 in step S10.

Next, in step S11, controller 18 operates inverter 10. Controller 18 starts up inverter 10 that is in the standby state, and outputs the generated gate signal to inverter 10. Furthermore, in step S12, controller 18 controls the boost operation in bidirectional chopper 7 such that DC voltage VDC reaches reference voltage VDCr.

In step S13, controller 18 controls the reverse conversion in converter 6 such that AC input voltage Vin equal to or higher than AC output voltage Vout is output from converter 6 to node N1. In step S14, controller 18 determines whether or not a prescribed time period has elapsed from the detection of the voltage drop of commercial AC power supply 21. When the prescribed time period has not elapsed from the voltage drop (NO in S14), controller 18 returns to step S13 and controls the reverse conversion in converter 6. In contrast, when the prescribed time period has elapsed from the voltage drop (YES in S14), controller 18 stops the operation of converter 6.

As described above, when the voltage drop of commercial AC power supply 21 is detected during the eco mode, the uninterruptible power supply device according to the embodiment of the present invention cuts off the gate signal of semiconductor switch 15 and causes converter 6 to perform the reverse conversion for the prescribed time period, to thereby increase the instantaneous value of AC input voltage Vin to be equal to or higher than the instantaneous value of AC output voltage Vout. With such a configuration, even if there is a time difference between when the gate signal of semiconductor switch 15 is cut off and when semiconductor switch 15 is turned off, the flow of inverter output current Iinv to the input side through semiconductor switch 15 can be reduced. Therefore, inverter output current Iinv can be supplied as it is to load 22 at the time of switching from the eco mode to the inverter power feeding mode, and thus, a power shortage in load 22 can be avoided.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 uninterruptible power supply device; 2, 8, 14 electromagnetic contactor; 3, 11 current detector; 4, 4a to 4c, 9, 13, 13a to 13c capacitor; 5, 5a to 5c, 12, 12a to 12c reactor; 6 converter; 6a to 6c input node; 7 bidirectional chopper; 10 inverter; 10a to 10c output node; 15 semiconductor switch; 17 operation unit; 18 controller; 21 commercial AC power supply; 22 load; 23 battery (power storage device); 30 voltage drop detection unit; 32 converter control unit; 34 chopper control unit; 36 inverter control unit; 38 switch control unit; T1, T1a to T1c AC input terminal; T2, T2a to T2c AC output terminal; T3 battery terminal; L1, L2 DC line; Vin AC input voltage; Vout AC output voltage.

The invention claimed is:

1. An uninterruptible power supply device connected between an AC power supply and a load, the uninterruptible power supply device comprising:
    a converter that performs forward conversion of AC power supplied from the AC power supply to DC power;
    an inverter that performs reverse conversion of the DC power output by the converter or DC power output by a power storage device to AC power;
    a first switch connected between the inverter and the load;
    a second switch connected between the AC power supply and the load; and
    a controller that controls the converter, the inverter, the first switch, and the second switch, wherein
    the uninterruptible power supply device has a first power feeding mode and a second power feeding mode as an operation mode, in the first power feeding mode, the controller turns on the first switch and turns off the second switch to thereby supply the AC power output by the inverter to the load, in the second power feeding mode, the controller turns off the first switch and turns on the second switch to thereby supply the AC power supplied from the AC power supply to the load,
    the controller performs switching the operation mode to the first power feeding mode when the controller detects a voltage drop of the AC power supply during execution of the second power feeding mode,
    the controller, for a prescribed time period from detection of the voltage drop of the AC power supply, causes the converter to perform the reverse conversion to convert the DC power output by the power storage device to the AC power, and controls the reverse conversion in the converter such that an instantaneous value of an AC voltage output from the converter becomes equal to or higher than an instantaneous value of an AC voltage output from the inverter,
    wherein
    the prescribed time period is set to have a length of not longer than a ½ cycle of an AC voltage supplied from the AC power supply, and
    the prescribed time period is set to have a length of not shorter than a ¼ cycle and not longer than the ½ cycle of the AC voltage supplied from the AC power supply.

2. The uninterruptible power supply device according to claim 1, wherein
    the controller, for the prescribed time period from detection of the voltage drop of the AC power supply, controls the reverse conversion in the converter such that the instantaneous value of the AC voltage output from the converter becomes higher than the instantaneous value of the AC voltage output from the inverter.

3. The uninterruptible power supply device according to claim 1, wherein
    the second switch is a thyristor switch having a pair of thyristors connected in antiparallel.

4. An uninterruptible power supply device, connected between an AC power supply and a load, the uninterruptible power supply device comprising:
    a converter that performs forward conversion of AC power supplied from the AC power supply to DC power;
    an inverter that performs reverse conversion of the DC power output by the converter or DC power output by a power storage device to AC power;
    a first switch connected between the inverter and the load;
    a second switch connected between the AC power supply and the load; and
    a controller that controls the converter, the inverter, the first switch, and the second switch, wherein
    the uninterruptible power supply device has a first power feeding mode and a second power feeding mode as an operation mode, in the first power feeding mode, the controller turns on the first switch and turns off the second switch to thereby supply the AC power output by the inverter to the load, in the second power feeding mode, the controller turns off the first switch and turns on the second switch to thereby supply the AC power supplied from the AC power supply to the load,
    the controller performs switching the operation mode to the first power feeding mode when the controller detects a voltage drop of the AC power supply during execution of the second power feeding mode,
    the controller, for a prescribed time period from detection of the voltage drop of the AC power supply, causes the converter to perform the reverse conversion to convert the DC power output by the power storage device to the AC power, and controls the reverse conversion in the converter such that an instantaneous value of an AC voltage output from the converter becomes equal to or higher than an instantaneous value of an AC voltage output from the inverter,
    wherein the second switch is a thyristor switch having a pair of thyristors connected in antiparallel, and
    wherein the controller, when the controller detects the voltage drop of the AC power supply, turns on the first switch and cuts off a gate signal of the thyristor switch, and controls the reverse conversion in the converter for the prescribed time period.

5. The uninterruptible power supply device according to claim 4, wherein
    the controller, for the prescribed time period from detection of the voltage drop of the AC power supply, controls the reverse conversion in the converter such that the instantaneous value of the AC voltage output from the converter becomes higher than the instantaneous value of the AC voltage output from the inverter.

6. The uninterruptible power supply device according to claim 5, wherein
    the prescribed time period is set to have a length of not longer than a ½ cycle of an AC voltage supplied from the AC power supply.

7. The uninterruptible power supply device according to claim 6, wherein
    the prescribed time period is set to have a length of not shorter than a ¼ cycle and not longer than the ½ cycle of the AC voltage supplied from the AC power supply.

* * * * *